US012785889B2

(12) United States Patent
Ma et al.

(10) Patent No.: US 12,785,889 B2
(45) Date of Patent: Nov. 3, 2026

(54) COMMUNICATION METHOD AND RELATED APPARATUS

(71) Applicant: HUAWEI TECHNOLOGIES CO., LTD., Shenzhen (CN)

(72) Inventors: Qianli Ma, Shenzhen (CN); Huang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 315 days.

(21) Appl. No.: 18/430,102

(22) Filed: Feb. 1, 2024

(65) Prior Publication Data

US 2024/0171342 A1 May 23, 2024

Related U.S. Application Data

(63) Continuation of application No. PCT/CN2022/110094, filed on Aug. 3, 2022.

(30) Foreign Application Priority Data

Aug. 5, 2021 (CN) ......................... 202110898784.4

(51) Int. Cl.
*H04L 5/00* (2006.01)

(52) U.S. Cl.
CPC .............. *H04L 5/005* (2013.01); *H04L 5/006* (2013.01)

(58) Field of Classification Search
CPC ..... H04L 5/005; H04L 5/006; H04L 25/0224; H04L 25/0226; H04L 25/03343; H04L 25/0222
See application file for complete search history.

(56) References Cited

U.S. PATENT DOCUMENTS

2009/0285193 A1* 11/2009 Kim ...................... H04L 5/0007 714/E11.113
2020/0358582 A1* 11/2020 Takeda .................. H04L 5/0023
(Continued)

FOREIGN PATENT DOCUMENTS

| | | | |
|---|---|---|---|
| CN | 106656902 | A | 5/2017 |
| CN | 111835389 | A | 10/2020 |
| WO | 2021081902 | A1 | 5/2021 |

OTHER PUBLICATIONS

International Search Report and Written Opinion in International Appln. No. PCT/CN2022/110094, mailed on Nov. 7, 2022, 18 pages (with English translation).
(Continued)

*Primary Examiner* — Chirag G Shah
*Assistant Examiner* — Joshua Smith
(74) *Attorney, Agent, or Firm* — Fish & Richardson P.C.

(57) ABSTRACT

Embodiments of this application disclose communication methods and apparatuses. In an embodiment, a method includes: determining, by a communication apparatus, a first signal, wherein the first signal comprises a reference signal block, the reference signal block comprises a first reference signal and a second reference signal, and the second reference signal indicates that a value of the first reference signal at a receiving end is a preset received value, and sending, by the communication apparatus, the first reference signal at a first moment, and sending, by the communication apparatus, the second reference signal at a second moment, wherein a time interval between the first moment and the second moment is equal to a time interval of X transmitted signals, and a time interval of two consecutive transmitted signals is Ts/n, wherein X is a positive integer, Ts is a symbol periodicity, and n is a quantity of signals transmitted in the symbol periodicity.

20 Claims, 5 Drawing Sheets

(56) References Cited

U.S. PATENT DOCUMENTS

| | | | | |
|---|---|---|---|---|
| 2022/0303097 | A1* | 9/2022 | Zhang | H04L 5/005 |
| 2022/0322105 | A1* | 10/2022 | Ren | H04L 5/0025 |
| 2024/0007989 | A1* | 1/2024 | Dong | H04L 5/0051 |
| 2024/0031095 | A1* | 1/2024 | Sun | H04L 5/0092 |

OTHER PUBLICATIONS

Javaudin et al., "Pilot-Aided ChannelEstimation for OFDM/OQAM," Proceedings of the 57th IEEE Semiannual Vehicular Technology Conference, Apr. 22, 2003, 3:1581-1585.

Bazzi et al., "Power Efficient Scattered Pilot Channel Estimation for FBMC/OQAM," Proceedings of 10th International ITG Conference on Systems, Communications and Coding, Feb. 2, 2015, 6 pages.

Extended European Search Report in European Appln. No. 22852272.8, mailed on Oct. 15, 2024, 11 pages.

* cited by examiner

COMMUNICATION METHOD AND RELATED APPARATUS

CROSS-REFERENCE TO RELATED APPLICATIONS

This application is a continuation of International Application No. PCT/CN2022/110094, filed on Aug. 3, 2022, which claims priority to Chinese Patent Application No. 202110898784.4, filed on Aug. 5, 2021. The disclosures of the aforementioned applications are hereby incorporated by reference in their entireties.

TECHNICAL FIELD

This application relates to the field of communication technologies, and in particular, to a phase noise processing method and a related apparatus.

BACKGROUND

High frequency (a frequency band higher than 6G, mainly including 28G, 39G, 60G, 73G, and the like) becomes a hotspot that is researched and developed in the field due to abundant frequency band resources of the high frequency, to meet increasing communication requirements. The high frequency may provide both a large bandwidth and a highly integrated antenna array for communication, to achieve a high throughput. However, a problem of phase noise (phase noise, PHN) in a high frequency band is very noticeable. Currently, a phase-tracking reference signal (phase-tracking reference signal, PTRS) is introduced to high frequency band communication of a 5th generation mobile communication technology (5G), and is for estimating and compensating for the phase noise.

In addition, in wireless transmission, interference (such as multipath interference introduced by a channel or interference of a system) usually exists, and the interference has great impact on system performance. To further eliminate interference in a signal, a non-linear precoding technology is usually used at a signal transmitting end to process the signal. Because a modulo operation introduced by the non-linear precoding technology may damage a phase and an amplitude of the PTRS, the phase noise may not be effectively processed.

SUMMARY

This application provides a communication method and a related apparatus, to effectively process phase noise in a signal.

According to a first aspect, this application provides a phase noise determining method. The method includes: A communication apparatus determines a first signal, where the first signal includes a reference signal block, and the reference signal block includes a first reference signal and a second reference signal. The second reference signal is used to make a received value of the first reference signal at a receiving end be a preset received value. The communication apparatus sends the first reference signal at a first moment, and sends the second reference signal at a second moment. An interval between the first moment and the second moment is equal to a time interval of X transmitted signals, and the time interval of the transmitted signals is Ts/n. X is a positive integer, Ts is a symbol periodicity, and n is a quantity of signals transmitted in the symbol periodicity. According to this method, the second reference signal can eliminate impact of interference on the first reference signal, so that the received value of the first reference signal at the signal receiving end is the preset received value, and the receiving end can effectively process phase noise based on the first signal.

With reference to the first aspect, in a possible implementation, the preset received value of the first reference signal is a subset of a preset set. For example, values included in the preset set may be factors commonly used during constellation modulation, for example, an outermost constellation point sqrt(2)/2 of a constellation symbol and a constellation point normalization-factor 3/sqrt(10). In addition, the outermost constellation point represents maximum signal energy that each symbol can reach. Therefore, when a value of the outermost constellation point is used, a PTRS can have effect of a maximum signal-to-noise ratio when a PAPR is not affected.

With reference to the first aspect, in a possible implementation, a value of the second reference signal is determined based on a value of the first reference signal, the preset received value of the first reference signal, and a value of interference to the first reference signal.

With reference to the first aspect, in a possible implementation, the value of the second reference signal is $\tilde{S}_{PTRS}(l)$, and $\tilde{S}_{PTRS}(l)=g(S(m)-\tilde{S}_{PTRS}(m)-f_{others}(m))$. g is an inverse function of a function for calculating the interference to the first reference signal, $\tilde{S}_{PTRS}(m)$ is a value of an $m^{th}$ reference signal in the first signal at a transmitting end, S(m) is a preset received value of the $m^{th}$ reference signal at the receiving end, $f_{others}(m)$ is a value of interference of a signal other than the second reference signal in the first signal to the first reference signal, m is a location index of the first reference signal, and l is a location index of the second reference signal.

With reference to the first aspect, in a possible implementation, the interference to the first reference signal includes inter-symbol interference caused by the second reference signal to the first reference signal, or non-linear interference caused by precoding of the communication apparatus.

With reference to the first aspect, in a possible implementation, the method further includes: The communication apparatus sends first indication information, where the first indication information indicates at least one of the following information: location information and quantity information of the second reference signal.

With reference to the first aspect, in a possible implementation, the location information indicates the location index of the second reference signal, or indicates a difference between the location index of the second reference signal and the location index of the first reference signal.

With reference to the first aspect, in a possible implementation, the first indication information is carried in at least one of the following signaling: radio resource control RRC signaling, media access control-control element MAC-CE signaling, and downlink control information DCI.

With reference to the first aspect, in a possible implementation, the method further includes: The communication apparatus sends second indication information, where the second indication information indicates that the second reference signal exists in the reference signal block.

According to a second aspect, this application provides another phase noise determining method. The method includes: A communication apparatus receives a first received signal at a third moment, and receives a second received signal at a fourth moment. The first received signal is a received first reference signal transmitted through a radio channel, the second received signal is a received second reference signal transmitted through the radio channel, and the second reference signal is used to make a received value of the first reference signal at a receiving end be a preset received value. An interval between the third moment and the fourth moment is equal to a time interval of X transmitted signals, and the time interval of the transmitted signals is Ts/n. X is a positive integer, Ts is a symbol periodicity, and n is a quantity of signals transmitted in the symbol periodicity. The communication apparatus determines phase noise based on the first reference signal, the first received signal, the second received signal, and the preset received value of the first reference signal. According to this method, the second reference signal can eliminate impact of interference on the first reference signal, so that the received value of the first reference signal at the signal receiving end is the preset received value, and the receiving end can effectively process the phase noise based on the received signal.

With reference to the second aspect, in a possible implementation, the preset received value of the first reference signal is a subset of a preset set.

With reference to the second aspect, in a possible implementation, a value of the first reference signal is determined based on a value of the second reference signal, the preset received value of the first reference signal, and a value of interference to the first reference signal.

With reference to the second aspect, in a possible implementation, the value of the first reference signal is y(m), and y(m)=S(m). S(m) is a preset received value of an $m^{th}$ reference signal at the receiving end, and m is a location index of the first reference signal.

With reference to the second aspect, in a possible implementation, the interference to the first reference signal includes inter-symbol interference caused by the second reference signal to the first reference signal, or non-linear interference caused by precoding of the communication apparatus.

With reference to the second aspect, in a possible implementation, the method further includes: The communication apparatus receives first indication information, where the first indication information indicates at least one of the following information: location information and quantity information of the second reference signal.

With reference to the second aspect, in a possible implementation, the location information indicates a location index of the second reference signal, or indicates a difference between the location index of the second reference signal and the location index of the first reference signal.

With reference to the second aspect, in a possible implementation, the first indication information is carried in at least one of the following signaling: radio resource control RRC signaling, media access control-control element MAC-CE signaling, and downlink control information DCI.

With reference to the second aspect, in a possible implementation, the method further includes: The communication apparatus receives second indication information, where the second indication information indicates that the second reference signal exists in a reference signal block.

According to a third aspect, this application provides a communication apparatus. The communication apparatus includes a transceiver unit and a processing unit. The processing unit is configured to determine a first signal, where the first signal includes a reference signal block, and the reference signal block includes a first reference signal and a second reference signal. The second reference signal is used to make a received value of the first reference signal at a receiving end be a preset received value. The transceiver unit is configured to send the first reference signal at a first moment, and send the second reference signal at a second moment. An interval between the first moment and the second moment is equal to a time interval of X transmitted signals, and the time interval of the transmitted signals is Ts/n. X is a positive integer, Ts is a symbol periodicity, and n is a quantity of signals transmitted in the symbol periodicity.

With reference to the third aspect, in a possible implementation, the preset received value of the first reference signal is a subset of a preset set.

With reference to the third aspect, in a possible implementation, a value of the second reference signal is determined based on a value of the first reference signal, the preset received value of the first reference signal, and a value of interference to the first reference signal.

With reference to the third aspect, in a possible implementation, the value of the second reference signal is $\tilde{S}_{PTRS}(l)$, and $\tilde{S}_{PTRS}(l)=g(S(m)-\tilde{S}_{PTRS}(m)-f_{others}(m))$. g is an inverse function of a function for calculating the interference to the first reference signal, $\tilde{S}_{PTRS}(m)$ is a value of an $m^{th}$ reference signal in the first signal at a transmitting end, S(m) is a preset received value of the $m^{th}$ reference signal at the receiving end, $f_{others}(m)$ is a value of interference of a signal other than the second reference signal in the first signal to the first reference signal, m is a location index of the first reference signal, and l is a location index of the second reference signal.

With reference to the third aspect, in a possible implementation, the interference to the first reference signal includes inter-symbol interference caused by the second reference signal to the first reference signal, or non-linear interference caused by precoding of the communication apparatus.

With reference to the third aspect, in a possible implementation, the transceiver unit is further configured to send first indication information, where the first indication information indicates at least one of the following information: location information and quantity information of the second reference signal.

With reference to the third aspect, in a possible implementation, the location information indicates the location index of the second reference signal, or indicates a difference between the location index of the second reference signal and the location index of the first reference signal.

With reference to the third aspect, in a possible implementation, the first indication information is carried in at least one of the following signaling: radio resource control RRC signaling, media access control-control element MAC-CE signaling, and downlink control information DCI.

With reference to the third aspect, in a possible implementation, the transceiver unit is further configured to send second indication information, where the second indication information indicates that the second reference signal exists in the reference signal block.

According to a fourth aspect, this application provides a communication apparatus. The communication apparatus includes a transceiver unit and a processing unit. The transceiver unit is configured to receive a first received signal at a third moment, and receive a second received signal at a fourth moment. The first received signal is a received first reference signal transmitted through a radio channel, the second received signal is a received second reference signal transmitted through the radio channel, and the second reference signal is used to make a received value of the first reference signal at a receiving end be a preset received value. An interval between the third moment and the fourth moment is equal to a time interval of X transmitted signals, and the time interval of the transmitted signals is Ts/n. X is a positive integer, Ts is a symbol periodicity, and n is a quantity of signals transmitted in the symbol periodicity. The processing unit is configured to determine phase noise based on the first reference signal, the first received signal, the second received signal, and the preset received value of the first reference signal.

With reference to the fourth aspect, in a possible implementation, the preset received value of the first reference signal is a subset of a preset set.

With reference to the fourth aspect, in a possible implementation, a value of the first reference signal is determined based on a value of the second reference signal, the preset received value of the first reference signal, and a value of interference to the first reference signal.

With reference to the fourth aspect, in a possible implementation, the value of the first reference signal is y(m), and y(m)=S(m). S(m) is a preset received value of an $m^{th}$ reference signal at the receiving end, and m is a location index of the first reference signal.

With reference to the fourth aspect, in a possible implementation, the interference to the first reference signal includes inter-symbol interference caused by the second reference signal to the first reference signal, or non-linear interference caused by precoding of the communication apparatus.

With reference to the fourth aspect, in a possible implementation, the transceiver unit is further configured to receive first indication information, where the first indication information indicates at least one of the following information: location information and quantity information of the second reference signal.

With reference to the fourth aspect, in a possible implementation, the location information indicates a location index of the second reference signal, or indicates a difference between the location index of the second reference signal and the location index of the first reference signal.

With reference to the fourth aspect, in a possible implementation, the first indication information is carried in at least one of the following signaling: radio resource control RRC signaling, media access control-control element MAC-CE signaling, and downlink control information DCI.

With reference to the fourth aspect, in a possible implementation, the transceiver unit is further configured to receive second indication information, where the second indication information indicates that the second reference signal exists in a reference signal block.

According to a fifth aspect, this application provides another communication apparatus, including a processor. The processor is coupled to a memory. The memory is configured to store program code. The processor is configured to invoke the program code in the memory to perform the method described in any one of the first aspect or the possible implementations of the first aspect; or perform the method described in any one of the second aspect or the possible implementations of the second aspect.

According to a sixth aspect, this application provides another communication apparatus. The communication apparatus includes a logic circuit and an input/output interface. The logic circuit is configured to determine a first signal, the first signal includes at least one reference signal block, and one reference signal block includes a first reference signal and a second reference signal. The input/output interface is configured to output the first reference signal at a first moment, and output the second reference signal at a second moment. The logic circuit is further configured to process the first signal, and perform the method described in any one of the first aspect or the possible implementations of the first aspect.

According to a seventh aspect, this application provides another communication apparatus. The communication apparatus includes a logic circuit and an input/output interface. The input/output interface is configured to input a first received signal at a third moment, and input a second received signal at a fourth moment. The logic circuit is configured to process the first received signal and the second received signal, and perform the method described in any one of the second aspect or the possible implementations of the second aspect.

According to an eighth aspect, this application provides a computer-readable storage medium. The computer-readable storage medium is configured to store instructions. When the instructions are executed, the method described in any one of the first aspect or the possible implementations of the first aspect, or the method described in any one of the second aspect or the possible implementations of the second aspect is implemented.

According to a ninth aspect, this application provides a computer program product. The computer program product includes a computer program or instructions. When the computer program or the instructions are run on a computer, the computer is enabled to perform the method described in any one of the first aspect or the possible implementations of the first aspect, or perform the method described in any one of the second aspect or the possible implementations of the second aspect.

In embodiments of this application, the first signal sent by the signal transmitting end includes the reference signal block, and the reference signal block includes the first reference signal and the second reference signal. The second reference signal is used to make the received value of the first reference signal at the receiving end be the preset received value. At the signal receiving end, the phase noise in the signal may be calculated based on the received first signal. In this manner, the impact of the interference on the first reference signal can be eliminated, and the phase noise can be effectively processed.

BRIEF DESCRIPTION OF DRAWINGS

To describe the technical solutions in embodiments of this application or in conventional technologies more clearly, the following briefly describes the accompanying drawings for describing embodiments or the conventional technologies.

DESCRIPTION OF EMBODIMENTS

The following describes in detail the technical solutions in embodiments of this application.

Terms used in the following embodiments of this application are merely intended to describe specific embodiments, but are not intended to limit this application. Terms "one", "a", "the", "the foregoing", "this", and "the one" of singular forms used in this specification and the appended claims of this application are also intended to include plural forms, unless otherwise specified in the context clearly. It should also be understood that, the term "and/or" used in this application indicates and includes any or all possible combinations of one or more associated listed items. The term "a plurality of" used in this application means two or more.

It should be further understood that, "first", "second", "third", "fourth", and various numbers in this specification are merely used for differentiation for ease of description, and are not intended to limit the scope of embodiments of this application.

Figure 1:
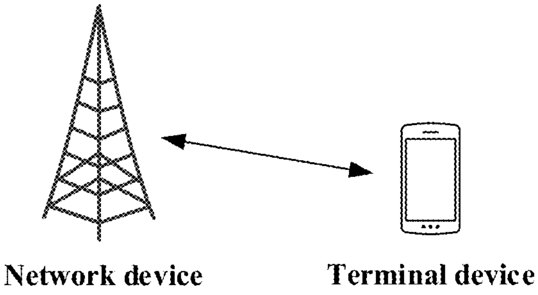
FIG. 1 is a schematic diagram of a network architecture according to an embodiment of this application.

Embodiments of this application may be applied to a network architecture shown in FIG. 1. The network architecture shown in FIG. 1 is a network architecture of a wireless communication system. The network architecture usually includes a terminal device and a network device. A quantity of each device and a form of each device do not constitute a limitation on embodiments of this application. For example, embodiments of this application may be applied to a scenario in which a multi-layer single carrier may be applied, such as multi-station transmission (a signal is simultaneously transmitted between same UE and a plurality of transmission points), backhaul, wireless to the x (wireless to the x, WTTx), an enhanced mobile broadband (enhanced mobile broadband, eMBB), and device to device (device to device, D2D). In embodiments of this application, the terminal device and the network device may communicate with each other by using a single carrier.

It should be noted that the wireless communication system mentioned in embodiments of this application includes but is not limited to an internet of things (internet of things, IoT) system, a long term evolution (long term evolution, LTE) system, a 5th generation mobile communication (5th generation, 5G) system, a 6th generation mobile communication (6th generation, 6G) system, and a future mobile communication system. In some embodiments, the technical solutions in embodiments of this application may alternatively be applied to a wireless local area network (Wireless Local Area Network, WLAN) network, a vehicle-to-everything (Vehicle-to-everything, V2X) network, a non-terrestrial network (non-terrestrial network, NTN), a satellite and a high-altitude platform (satellite and High-Altitude Platform, HAP), an enhanced internet of things (LTE enhanced MTO, eMTC), or another network. In some other embodiments, the technical solutions in embodiments of this application may alternatively be applied to communication radar integration, terahertz, a communication system with a higher frequency, and the like. This is not specifically limited in this application.

The network device in embodiments of this application may be a base station (Base Station, BS). The base station may provide a communication service for a plurality of terminal devices. Alternatively, a plurality of base stations may provide a communication service for a same terminal device. In embodiments of this application, the base station is an apparatus deployed in a radio access network to provide a wireless communication function for the terminal device. The base station device may be a base station, a relay station, or an access point. The base station may be an eNB or an eNodeB (Evolved NodeB) in long term evolution (Long Term Evolution, LTE). The base station device may alternatively be a radio controller in a cloud radio access network (Cloud Radio Access Network, CRAN) scenario. The base station device may alternatively be a base station device in a future 5G network or a network device in a future evolved PLMN network. The base station device may alternatively be a wearable device, a vehicle-mounted device, or the like. In embodiments of this application, an apparatus configured to implement a function of the network device may be a network device, or may be an apparatus that can support the network device in implementing the function, for example, a chip system. The apparatus may be mounted in the network device.

The terminal device in embodiments of this application may also be referred to as a terminal, and may be a device having a wireless transceiver function. The terminal device in embodiments of this application may include user equipment (user equipment, UE), an access terminal, a UE unit, a UE station, a mobile station, a mobile console, a remote station, a remote terminal, a mobile device, a UE terminal, a terminal, a wireless communication device, a UE agent, or a UE apparatus that has the wireless communication function. The access terminal may be a cellular phone, a cordless phone, a session initiation protocol (Session Initiation Protocol, SIP) phone, a wireless local loop (Wireless Local Loop, WLL) station, personal digital assistant (Personal Digital Assistant, PDA), a handheld device that has a wireless communication function, a computing device or another processing device connected to a wireless modem, an uncrewed aerial vehicle (which is alternatively referred to as a drone for short) (uncrewed aerial vehicle/drone, UVA), a vehicle-mounted device, a wearable device, a terminal device in a future 5G network, a terminal device in a future evolved PLMN network, or the like. In embodiments of this application, an apparatus configured to implement a function of the terminal may be a terminal, or may be an apparatus, for example, a chip system, that can support the terminal in implementing the function. The apparatus may be mounted in the terminal. In embodiments of this application, the chip system may include a chip, or may include a chip and another discrete component.

Embodiments of this application may be applied to a device to device (device to device, D2D) system, a machine to machine (machine to machine, M2M) system, a vehicle to everything (vehicle to everything, V2X) system, and the like.

Embodiments of this application may be applied to a next-generation microwave scenario, an NR-based microwave scenario, a backhaul (integrated access backhaul, IAB) scenario, or the like.

Embodiments of this application may be applied to an uplink transmission scenario, to be specific, a scenario in which the terminal device sends an uplink signal to the network device; or may be applied to a downlink transmission scenario, to be specific, a scenario in which the network device sends a downlink signal to the terminal device.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that with evolution of the network architecture and emergence of new service scenarios, the technical solutions provided in embodiments of this application are also applicable to similar technical problems.

The following describes some concepts in embodiments of this application.

(1) Peak to Average Power Ratio (Peak to Average Power Ratio, PAPR)

A radio signal is a sine wave whose amplitude constantly changes when being observed in time domain. The amplitude is not constant. A peak amplitude of a signal in a periodicity is different from that in another periodicity. Therefore, average power and peak power in each periodicity are different. In long duration, the peak power is maximum transient power that occurs at a probability. The probability is usually 0.01% (that is, 10^-4). A ratio of the peak power under the probability to total average power of a system is the PAPR.

Power needs to be amplified when a signal of a wireless communication system needs to be sent to a remote place. Due to limitation of a technology and device costs, a power amplifier usually linearly amplifies power within a range, and signal distortion is caused when the range is exceeded. When the signal distortion occurs, consequently, a receiving end for receiving a signal cannot correctly parse the signal. To ensure that a peak value of the signal is still within the linear range in which the power amplifier can normally amplify the power, average power of the sent signal needs to be reduced. This manner causes low efficiency of the power amplifier, which is equivalent to smaller coverage of the power amplifier.

Because a signal of orthogonal frequency division multiplexing (orthogonal frequency division multiplexing, OFDM) on a carrier is represented as a sinc (sinc) function, there are tailings on left and right sides. Tailings of a plurality of carriers may be superimposed at a distance at a probability, and form a point with high peak power, that is, a problem of an excessively high PAPR is easily caused when an OFDM waveform is used.

(2) Single Carrier (Single Carrier)

The single carrier has a lower PAPR than that of an OFDM waveform, and the present invention considers a scenario in which data is transmitted by using a single carrier-based waveform. The single carrier includes but is not limited to the following waveforms: a single carrier-quadrature amplitude modulation (single carrier-quadrature amplitude modulation, SC-QAM) waveform, a discrete Fourier transform-spread-orthogonal frequency division multiplexing (discrete Fourier transform-spread-orthogonal frequency division multiplexing, DFT-s-OFDM)-based waveform, a DFT-s-OFDM waveform with detached real and imaginary parts, a single carrier-offset quadrature amplitude modulation (Single carrier-Offset quadrature amplitude modulation, SC-OQAM) waveform, and a single carrier transform-spread-orthogonal frequency division multiplexing (discrete Fourier transform spread orthogonal frequency division multiplexing, DFT-s-OFDM with FTSS)-based waveform. The single carrier carries a DFT-s-OFDM waveform of a pulse amplitude modulation (pulse amplitude modulation, PAM) constellation, a DFT-s-OFDM waveform of an additive shaping filter of the PAM constellation, a DFT-s-OFDM waveform with detached real and imaginary parts of the additive shaping filter, a unique word discrete Fourier transform-spread-orthogonal frequency division multiplexing (unique word discrete Fourier transform-spread-OFDM, uw-DFT-s-OFDM) waveform, a uw-DFT-s-OFDM waveform with detached real and imaginary parts, a uw-DFT-s-OFDM with frequency-domain truncated spectrum shaping (uw-DFT-s-OFDM with FTSS) waveform, a uw-DFT-s-OFDM waveform of the PAM constellation, a uw-DFT-s-OFDM waveform with detached real and imaginary parts of the additive shaping filter, a uw-DFT-s-OFDM waveform of the additive shaping filter of the PAM constellation, a zero tail discrete Fourier transform-spread-orthogonal frequency division multiplexing (zero tail discrete Fourier transform-spread-OFDM, zt-DFT-s-OFDM) waveform, a zt-DFT-s-OFDM with frequency-domain truncated spectrum shaping (zt-DFT-s-OFDM with FTSS) waveform, a zt-DFT-s-OFDM waveform with detached real and imaginary parts, a zt-DFT-s-OFDM waveform of the PAM constellation, a zt-DFT-s-OFDM waveform with detached real and imaginary parts of the additive shaping filter, a zt-DFT-s-OFDM waveform of the additive shaping filter of the PAM constellation, and the like. It should be noted that the foregoing waveforms are named based on features of the waveforms. During actual application, the foregoing waveforms may alternatively be named in another manner.

Figure 2:
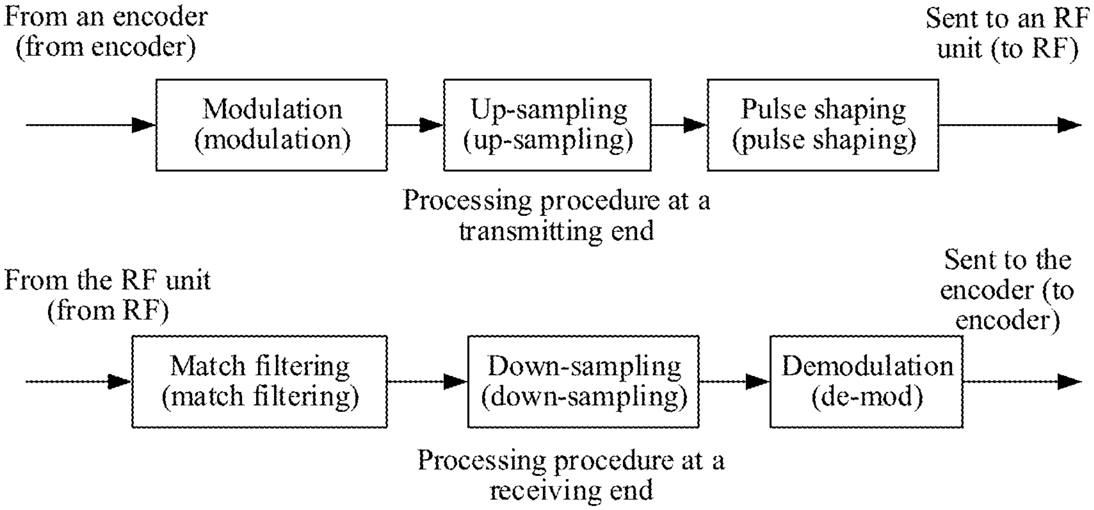
FIG. 2 is a schematic diagram of a processing procedure of an SC-QAM technology according to an embodiment of this application.

The SC-QAM is a common single carrier waveform technology, and is widely used in $2^{nd}$-generation mobile communication (2nd-generation, 2G) or a Wi-Fi communication system. For a processing procedure at a transmitting end and a receiving end of the SC-QAM, refer to FIG. 2. Specifically, for the transmitting end, a communication signal is obtained from an encoder (encoder), processing such as modulation (modulation), up-sampling (up-sampling), and pulse shaping (pulse shaping) is performed sequentially, and then the signal is sent by using a radio frequency (radio frequency, RF) unit. For the receiving end, a communication signal is obtained from the radio frequency unit, processing such as match filtering (match filtering), down-sampling (down-sampling), and demodulation (demod) is performed sequentially, and then the signal is sent to the encoder (encoder) for processing. It can be learned that sending and receiving of the SC-QAM are both completed in time domain, and time domain-frequency domain transformation is not involved. Therefore, there is no fast Fourier transform (fast Fourier transform, FFT)/inverse fast Fourier transform (inverse fast Fourier transform, IFFT) process, and only the match filtering, the up-sampling, and the down-sampling in time domain are required. Therefore, in comparison with a multi-carrier system, the SC-QAM has advantages of low complexity and a low PAPR.

The DFT-s-OFDM is a single carrier waveform technology based on an OFDM implementation architecture. In comparison with the OFDM waveform, the DFT-s-OFDM waveform provides higher output power and higher power amplification efficiency at a same power amplification level, so that coverage can be improved and energy consumption can be reduced. Currently, in a long term evolution (long term evolution, LTE) system and a 5th generation (5th generation, 5G) (or referred to as new radio (new radio, NR)) communication system, the DFT-s-OFDM waveform may be applied to uplink transmission. However, in high frequency communication, because a capability of a component is limited and a PAPR problem is serious, the DFT-s-OFDM waveform may alternatively be applied to downlink transmission in the future. A frequency band for the high frequency communication may be 24250 MHz to 52600 MHz in the NR system, may be a frequency band higher than 52600 MHz supported by a subsequently evolved NR system, or may be a higher frequency band, for example, a terahertz (THz) frequency band, in a next-generation communication system.

The DFT-s-OFDM technology has an extra discrete Fourier transform (discrete Fourier transform, DFT) processing before OFDM processing. Therefore, the DFT-s-OFDM technology may also be referred to as a linear precoding OFDM technology.

Figure 3:
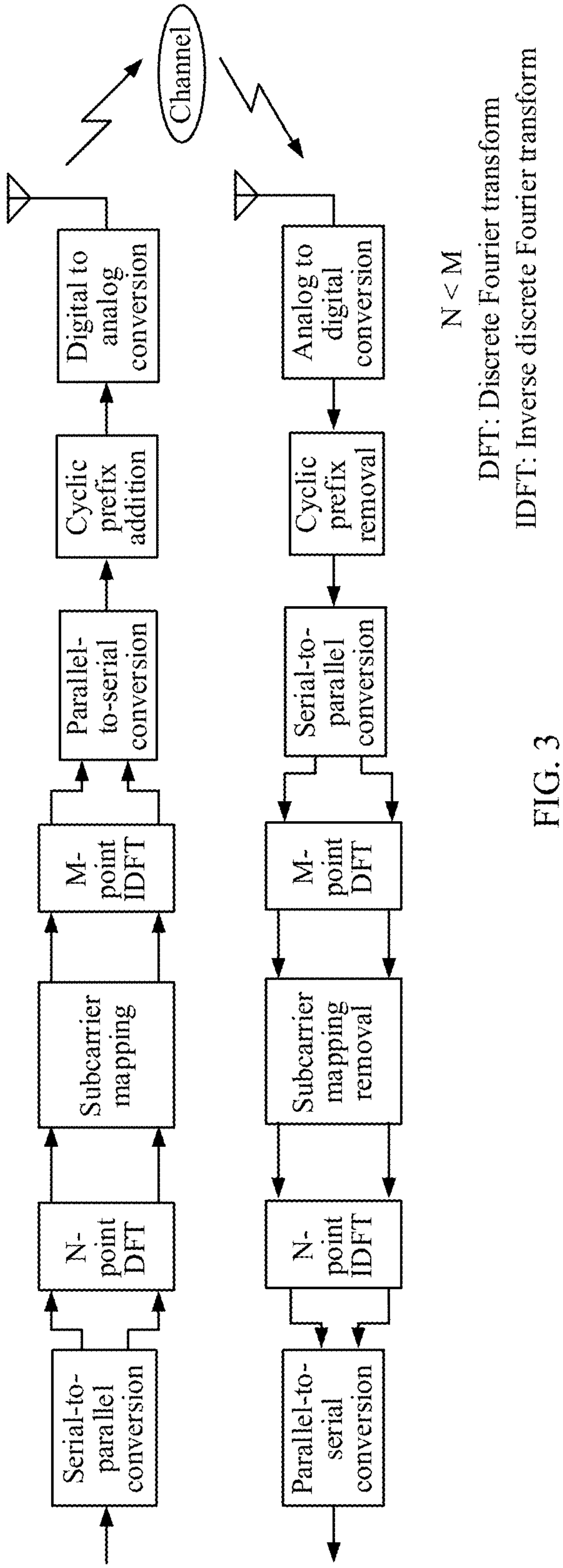
FIG. 3 is a schematic diagram of a processing procedure of a DFT-s-OFDM technology according to an embodiment of this application.

FIG. 3 is a schematic diagram of a processing procedure of a DFT-s-OFDM technology according to an embodiment of this application. A transmitting end sequentially performs serial-to-parallel (serial-to-parallel) conversion, N-point discrete Fourier transform (discrete Fourier transform, DFT), subcarrier mapping, M-point inverse discrete Fourier transform (inverse discrete Fourier transform, IDFT), parallel-to-serial (parallel-to-serial) conversion, cyclic prefix (cyclic prefix, CP) addition, and digital to analog conversion (digital to analog converter, DAC) processing on a time domain discrete sequence; and then sends a signal through an antenna port and a channel (channel). When receiving the signal through the channel and the antenna port, a receiving end sequentially performs the following processing on the signal: analog to digital conversion (analog to digital converter, ADC), cyclic prefix removal, serial-to-parallel (serial-to-parallel) conversion, M-point DFT, subcarrier mapping removal, N-point IDFT, and parallel-to-serial (parallel-to-serial) conversion, to obtain the time domain discrete sequence.

The transmitting end can obtain a frequency domain sequence of the time domain discrete sequence through the N-point DFT. After the subcarrier mapping is performed on the frequency domain sequence, the IDFT is input to perform the M-point IDFT, where N<M. Because a length of the IDFT is greater than a length of the DFT, a part that is in the IDFT and by which the length of the IDFT exceeds the length of the DFT is filled with zeros when being input. After the IDFT is performed, the cyclic prefix is added to avoid symbol interference.

In comparison with the OFDM, the DFT-s-OFDM has advantages of a lower PAPR and lower complexity of a transmitter. For a high frequency and large bandwidth, the single-carrier waveform SC-QAM or DFT-S-OFDM has some advantages in comparison with the OFDM.

(3) Phase Noise (Phase Noise, PN)

The phase noise (or referred to as PN for short) refers to a random change of a phase of an output signal of a communication device caused when the communication device (for example, various radio frequency components) that sends a signal is affected by various noises. To resolve an increasing communication requirement, in a communication system, a frequency band resource of a high frequency (a frequency band higher than 6G, mainly including 28G, 39G, 60G, 73G, and the like) is increasingly used to transmit a signal. The high frequency may provide both a large bandwidth and a highly integrated antenna array for communication, to achieve a high throughput. However, a problem of the phase noise of a high frequency band is very noticeable. As a frequency band increases, power spectral density of the phase noise is higher, and impact on a received signal is greater. When a frequency band of a transmitted signal is high, deterioration of the phase noise causes deterioration of signal demodulation performance, and communication quality is reduced. To estimate and compensate for the phase noise of the signal, a phase-tracking reference signal (phase-tracking reference signal, PTRS) is introduced to this field.

For example, for impact of the phase noise, refer to a formula 1-1:

$$y(n)=x(n)e^{j\theta_n} \quad \text{Formula 1-1}$$

n=0, 1, . . . , N−1, and is a time domain sampling point. In brief, the phase noise is a random phase value generated at each sampling point n. A basic principle of estimating phase noise by using the PTRS is that: A known PTRS (that is, known x(n)) is placed at a transmitting end, a received PTRS (that is, known y(n)) is read at a receiving end, and a value of the phase noise (that is, a value of θ) may be calculated based on x(n) and y(n).

However, in wireless transmission, interference usually exists, for example, multipath interference introduced by a channel, interference introduced by another user equipment in a multi-station transmission scenario, or interference of a system (for example, a multiple input multiple output (multiple input multiple output, MIMO) system, or a system using faster than Nyquist (faster than Nyquist, FTN) modulation), and the interference has large impact on system performance. In a communication scenario with large interference, to better reduce impact of the interference on a signal, the signal is usually processed by using a non-linear precoding technology at a signal transmitting end.

Figure 4:
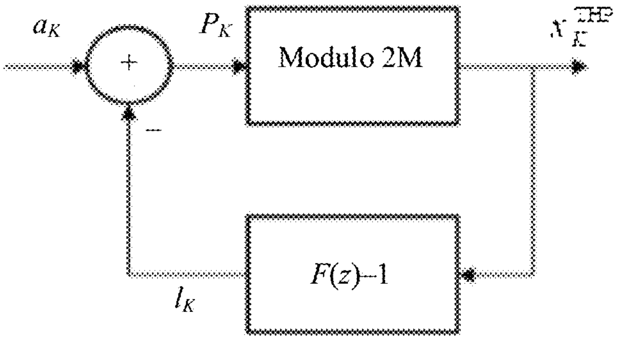
FIG. 4 is a schematic flowchart of a non-linear modulo operation according to an embodiment of this application.

A principle of the non-linear precoding technology is to pre-eliminate the interference at the signal transmitting end. In addition, to reduce impact of signal power increase caused by an interference elimination matrix, a non-linear modulo operation is introduced to the non-linear precoding technology. FIG. 4 is a schematic flowchart of a non-linear modulo operation according to an embodiment of this application. $a_k$ is an input signal, for example, a quadrature amplitude modulation (quadrature amplitude modulation, QAM) constellation point, $I_k$ is an interference item, and $$x_k^{THP}$$

is an output signal. M is a maximum value of an amplitude of a signal of the modulo operation. The output signal may be shown with reference to a formula 1-2.

$$x_k^{THP} = p_k - 2M\left\lfloor \frac{p_k}{2M} + \frac{1}{2} \right\rfloor \quad \text{Formula 1-2}$$

$p_k=a_k-I_k$. The non-linear modulo operation is to limit an amplitude of a signal whose interference is eliminated to [−M, M], so as to avoid a problem of excessively large signal fluctuation caused by the non-linear precoding.

It is assumed that the signal transmitting end uses the non-linear precoding. For a received signal $z_k$ of any pilot signal (PTRS), refer to a formula 1-3.

$$z_k=\lambda_0 e^{j\Psi_k}(a_k+2Md_k)+n_k \quad \text{Formula 1-3}$$

$\lambda_0$ is an amplitude coefficient, $e^{j\Psi_k}$ is phase noise, $$d_k = -\left\lfloor \frac{p_k}{2M} + \frac{1}{2} \right\rfloor$$

is non-linearity caused by the modulo operation of the non-linear precoding, and a value of $d_k$ is an integer. For example, the value may be selected from 0, 1, 2, 3, 4 . . . $p_k$ is an input signal before the non-linear precoding, and $n_k$ is white Gaussian noise. In this case, for the phase noise estimation by the PTRS, refer to a formula 1-4.

$$\hat{\Psi}_k = \text{angle}\left(\frac{z_k}{a_k + 2Md_k}\right) \quad \text{Formula 1-4}$$

However, the modulo operation is non-linear, and the value of $d_k$ is unknown. Therefore, the estimated phase is inaccurate. It is understood from a principle that this is because the modulo operation of the non-linear precoding may damage a phase and an amplitude of the PTRS, and consequently, the estimated phase noise is inaccurate.

In view of this, the solutions in embodiments of this application are provided. In embodiments of this application, a pilot signal at the signal transmitting end is designed, so that received values of a part of the pilot signals at the signal receiving end are preset received values. The phase noise in the signal is calculated at the signal receiving end based on the received pilot signal. In this manner, impact of the interference on the part of the pilot signals is eliminated, and the phase noise can be effectively determined.

Figure 5:
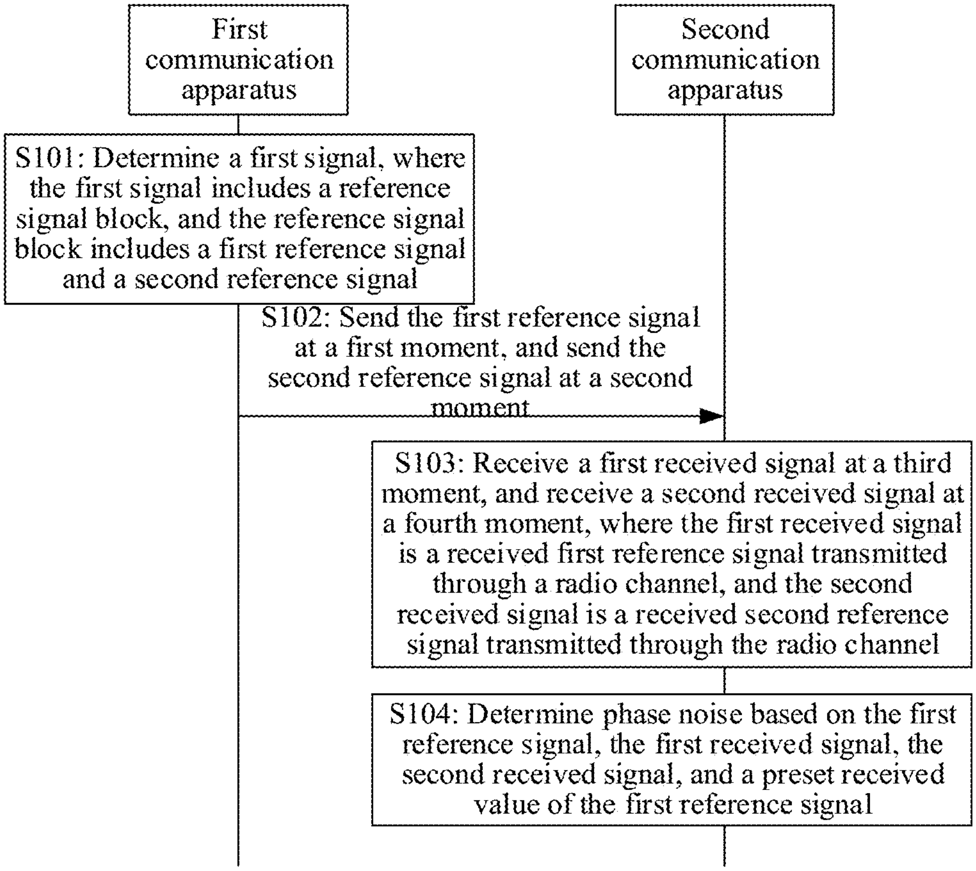
FIG. 5 is a flowchart of a communication method according to an embodiment of this application.

Based on the network architecture, the terminal device, and the network device described in the foregoing content, the following describes a phase noise determining method provided in an embodiment of this application. FIG. 5 is a flowchart of a communication method according to an embodiment of this application. The method may be implemented based on the network architecture shown in FIG. 1. In an implementation, a first communication apparatus may be the network device in FIG. 1, and a second communication apparatus may be the terminal device in FIG. 1. In another implementation, a first communication apparatus may be the terminal device in FIG. 1, and a second communication apparatus may be the network device in FIG. 1. The method includes the following steps.

S101: The first communication apparatus determines a first signal.

In a possible implementation, the first communication apparatus may generate the first signal. In another possible implementation, the first communication apparatus may alternatively generate a part of signals in the first signal, and receive a part of signals in the first signal from another communication apparatus. For example, the first communication apparatus may receive a data signal sent by the another communication apparatus to the first communication apparatus, and then the first communication apparatus generates the first signal in combination with the data signal.

Specifically, the first signal includes a reference signal block, and the reference signal block includes a first reference signal and a second reference signal. The second reference signal is used to make a received value of the first reference signal at a receiving end be a preset received value. The preset received value of the first reference signal may be understood as that: After the first reference signal, the second reference signal, and the data signal are received by using a waveform, a value of an excepted received signal at a signal location of the first reference signal is equal to the preset received value.

Optionally, the reference signal block may further include the data signal. In this embodiment of this application, the second reference signal is used to eliminate impact of interference on the first reference signal, so that the received value of the first reference signal at the signal receiving end is the preset received value. In this way, the impact of the interference is eliminated, and the signal receiving end can effectively process phase noise of the first signal based on the received first signal. It should be noted that the interference may include one or more of inter-symbol interference generated by the second reference signal to the first reference signal, inter-symbol interference generated by the data signal to the first reference signal, or non-linear interference generated by precoding of the first communication apparatus. In addition, the interference may alternatively be introduced due to another reason. A reason for forming the interference, which is also referred to as an interference type, is not limited in this embodiment of this application.

The first reference signal and the second reference signal are reference signals that are provided by a signal transmitting end (the first communication apparatus) for the signal receiving end (the second communication apparatus) and that are used to estimate the phase noise of the first signal. For example, the first reference signal and the second reference signal may be phase-tracking reference signals (phase-tracking reference signals, PTRSs). It should be noted that, with evolution of communication technologies, the first reference signal and the second reference signal may alternatively be other named reference signals. Possibly, the reference signals may further have some other functions. Names of the reference signals are not limited in this embodiment of this application.

In this embodiment of this application, the first communication apparatus (the signal transmitting end) and the second communication apparatus (the signal receiving end) pre-agree on the preset received value of the first reference signal in the first signal, and location information, or both location information and quantity information of the first reference signal. After receiving the first signal, the second communication apparatus may determine the first reference signal from the first signal based on the location information (or further including the quantity information) of the first reference signal, and then calculate the phase noise of the first signal based on an actual received value and the preset received value of the first reference signal. Next, the second communication apparatus may determine the data signal from the first signal based on the location information of the first reference signal and location information (or further including quantity information) of the second reference signal, then perform phase noise compensation on the data signal based on the calculated phase noise, and demodulate a compensated signal to obtain data information. It can be learned that, in this embodiment of this application, the signal receiving end does not need to know a value of the second reference signal, and does not need to perform demodulation processing on the second reference signal.

In a possible implementation, the first communication apparatus further sends first indication information to the second communication apparatus. The first indication information indicates at least one of the following information: the location information and the quantity information of the second reference signal. Optionally, the location information indicates a location index of the second reference signal, or indicates a difference between the location index of the second reference signal and a location index of the first reference signal. Correspondingly, the second communication apparatus receives the first indication information, and the second communication apparatus may determine the second reference signal from the first signal based on the first indication information.

In an example, the first indication information may indicate that b second reference signals are sequentially placed at a location of a location index that is a units greater than a maximum location index value of the first reference signal. In another example, the first indication information may indicate that a difference between a minimum location index value of the second reference signal and a minimum location index value of the first reference signal is −2 and −1. In another example, the first indication information may indicate that a difference between a maximum location index value of the second reference signal and a maximum location index value of the first reference signal is 1 and 2, and a quantity of second reference signals is 2.

In another possible implementation, the first communication apparatus and the second communication apparatus may pre-agree on the location information of the second reference signal in the first signal, or location information and quantity information of a second signal. In this case, the first communication apparatus further sends second indication information to the second communication apparatus. The second indication information indicates that the second reference signal exists in the reference signal block. In this manner, the first communication apparatus may notify the second communication apparatus that the second reference signal exists in the first signal, and the second communication apparatus should process the first signal in a corresponding receiving manner. This solution may be distinguished from a solution in which only one type of reference signal exists in a signal in a conventional technology.

Optionally, the first indication information and the second indication information may be carried in at least one of the following signaling: radio resource control (radio resource control, RRC) signaling, media access control-control element (media access control-control element, MAC-CE) signaling, and downlink control information (downlink control information, DCI). It should be noted that, with evolution of communication technologies, names of the signaling may change. In some other possible implementations, the first indication information and the second indication information may alternatively be carried in some other signaling.

S102: The first communication apparatus sends the first reference signal to the second communication apparatus at a first moment, and sends the second reference signal to the second communication apparatus at a second moment.

An interval between the first moment and the second moment is equal to a time interval of X transmitted signals, and the time interval of the transmitted signals is Ts/n, where X is a positive integer, Ts is a symbol periodicity, and n is a quantity of signals transmitted in the symbol periodicity. Ts−1/scs, where scs is a subcarrier spacing. n is a quantity of signals transmitted in the symbol periodicity, and n is known by the signal transmitting end and the receiving end, and is determined by a transmission bandwidth allocated by a base station to a user.

It should be noted that the signal sent by the first communication apparatus to the second communication apparatus is a signal obtained after a series of processing is performed on the first reference signal and the second reference signal, for example, a signal obtained after processing such as discrete Fourier transform (DFT), subcarrier de-mapping (subcarrier de-mapping), inverse fast Fourier transform (IFFT), and add cyclic prefix (add CP). After the processing, the first reference signal and the second reference signal are sent to the second communication apparatus through a radio channel in a form of an electromagnetic wave.

S103: The second communication apparatus receives a first received signal at a third moment, and receives a second received signal at a fourth moment. The first received signal is a received first reference signal transmitted through the radio channel, and the second received signal is a received second reference signal transmitted through the radio channel.

An interval between the third moment and the fourth moment is equal to a time interval of X transmitted signals, and the time interval of the transmitted signals is Ts/n, where X is a positive integer, Ts is a symbol periodicity, and n is a quantity of signals transmitted in the symbol periodicity. Because signal transmission requires time, there is a time difference between the third moment and the first moment, and there is a time difference between the fourth moment and the second moment. In addition, due to impact of the phase noise, the first received signal received by the second communication apparatus is not completely same as the first reference signal, and the second received signal is not completely same as the second reference signal.

S104: The second communication apparatus determines the phase noise based on the first reference signal, the first received signal, the second received signal, and the preset received value of the first reference signal.

It should be noted that the second communication apparatus may determine, based on the location information of the first reference signal and the location information of the second reference signal, the first received signal and the second received signal that are in the signals received by the second communication apparatus. In addition, the second communication apparatus needs to perform a series of processing on a signal actually received through an antenna, for example, de-cyclic prefix removal (-CP) processing, fast Fourier transform (FFT), subcarrier de-mapping, channel equalization (channel equalization) processing (eliminating impact of radio channel transmission), and time-frequency conversion, to obtain the first received signal and the second received signal.

Due to a design of the second reference signal, at the receiving end of the signal, the received value of the first reference signal should be the preset received value. However, in an actual transmission process, there is still the impact of the phase noise, and an actual value of the first received signal is different from the preset received value of the first reference signal. Refer to the foregoing formula 1-1, the preset received value of the first reference signal may be equivalent to x(n), and the value of the first received signal may be equivalent to y(n), so that the phase noise may be estimated (or referred to as determined and calculated).

In some embodiments, after the phase noise is calculated, the second communication apparatus may determine, based on the location information (or further including the quantity information) of the first reference signal and the second reference signal, the data signal from the signals received by the second communication apparatus, then perform phase noise compensation on the data signal based on the calculated phase noise, and demodulate a compensated signal to obtain data information. For a manner of determining the location information of the first reference signal and the second reference signal (or further including the quantity information), refer to the descriptions in step S101. Details are not described herein again.

The foregoing describes the communication method provided in embodiments of this application. The following describes the first signal in more detail.

In some embodiments, the preset received value of the first reference signal is a subset of a preset set. In a first possible implementation, the preset set may include at least one of the following values: $\sqrt{2}/2$, 1, $\sqrt{2}$, $3/\sqrt{10}$, $5/\sqrt{42}$, $3/\sqrt{42}$, $7/\sqrt{170}$, $5/\sqrt{170}$, $3/\sqrt{170}$, $9/\sqrt{648}$, $7/\sqrt{648}$, $5/\sqrt{648}$, $3/\sqrt{648}$, $j\sqrt{2}/2$, j, $j\sqrt{2}$, $j3/\sqrt{10}$, $j5/\sqrt{42}$, $j3/\sqrt{42}$, $j7/\sqrt{170}$, $j5/\sqrt{170}$, $j3/\sqrt{170}$, $j9/\sqrt{648}$, $j7/\sqrt{648}$, $j5/\sqrt{648}$, and $j3/\sqrt{648}$. In another expression manner, the preset received value is represented by using a square root function ($\mathrm{sqrt}(x)=\sqrt{x}$). In this case, the preset set may include at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt(648), 3/sqrt(648), jsqrt(2)/2, j, jsqrt(2), j3/sqrt(10), j5/sqrt(42), j3/sqrt(42), j7/sqrt(170), j5/sqrt(170), j3/sqrt(170), j9/sqrt(648), j7/sqrt(648), j5/sqrt(648), and j3/sqrt(648). It should be noted that, during actual application, the preset received value may be an approximate value of the foregoing listed values, for example, $\sqrt{2}/2$ may be selected as 0.707. These values listed in the foregoing examples are factors commonly used in constellation modulation, for example, an outermost constellation point sqrt(2)/2 of a constellation symbol and a constellation point normalization-factor 3/sqrt(10). These values are all defined by a protocol, and therefore are preset values that are easily accepted. In addition, the outermost constellation point represents maximum signal energy that each symbol can reach. Therefore, when a value of the outermost constellation point is used, a PTRS can have effect of a maximum signal-to-noise ratio when a PAPR is not affected.

The values of the first reference signal and the second reference signal are related to the preset received value of the first reference signal. To further improve a freedom degree of the values of the first reference signal and the second reference signal, and enable the value of the first reference signal or the value of the second reference signal to meet personalized requirements of more scenarios, the preset set may alternatively be another value set. The following describes some possible value selection manners.

In a second possible implementation, the preset set may include AS(m), where S(m) may be considered as a basic preset received value. For a value of S(m), refer to the value in the preset set described in the first possible implementation. The parameter A is used to adjust an amplitude size of S(m). Optionally, a value of A may be one or more of the following values: 1, 1.5, 0.5, $\sqrt{2}$, $\sqrt{10}$, $\sqrt{42}$, $\sqrt{170}$, $\sqrt{648}$, and the like. In another expression manner, the value of A is represented by using the square root function (sqrt(x)=$\sqrt{x}$). In this case, the value of A may be one of the following values: 1, 1.5, 0.5, sqrt(2), sqrt(10), sqrt(42), sqrt(170), sqrt(648), and the like. It should be noted that, during actual application, the value of A may be an approximate value of the foregoing listed values, for example, $\sqrt{2}$ may be selected as 1.414 (or 1.41, or 1.4). In the value selection manner, the value of A refers to a value of energy of an existing constellation point. This is because the energy of the constellation point is already defined in the protocol and can be easily obtained. In addition, the value of A may be associated with a constellation point of a transmitted signal. In this way, the receiving end may obtain a determined value of A based on a received signal. In addition, the value of A is from the constellation point (data signal selection), so that it can be ensured that energy of the first signal is not excessively high.

In a third possible implementation, the preset set may include $e^{j\beta_m}S(m)$, where S(m) may be considered as a basic preset received value. For a value of S(m), refer to the value in the preset set described in the first possible implementation. The parameter $\beta_m$ is used to adjust a phase size of S(m). Optionally, a value of the parameter $\beta_m$ may be one or more of the following values:

$$\pm\left\{0, \frac{\pi}{2}, \frac{\pi}{4}, \frac{\pi}{8}, \frac{3\pi}{8}, \frac{5\pi}{8}, \frac{\pi}{16}, \frac{3\pi}{16}, \frac{5\pi}{16}, \frac{7\pi}{16}, \frac{9\pi}{16}\right\},$$

-continued $$\text{or, } \pm\left\{\pi + \left(0, \frac{\pi}{2}, \frac{\pi}{4}, \frac{\pi}{8}, \frac{3\pi}{8}, \frac{5\pi}{8}, \frac{\pi}{16}, \frac{3\pi}{16}, \frac{5\pi}{16}, \frac{7\pi}{16}, \frac{9\pi}{16}\right)\right\}.$$

For example, for the value of the parameter $\beta_m$, refer to the following factors: 1. Refer to an amplitude coefficient of a sending constellation point (an amplitude coefficient of a constellation point such as a QPSK signal, 16 QAM, or 64 QAM). 2. Refer to a coefficient of a filter: For example, an interference value of an RRC filter with afa=1 is 0.5 after matched reception. 3. Refer to that increase in a signal amplitude of a single-carrier signal does not affect a typical value of the PAPR. In the value selection manner of, accuracy of phase noise estimation by the PTRS can be ensured and no non-linear loss is caused.

In a fourth possible implementation, the preset set may include $Ae^{j\beta_m}S(m)$, where S(m) may be considered as a basic preset received value. For a value of S(m), refer to the value in the preset set described in the first possible implementation. The parameter A is used to adjust an amplitude of S(m), and the parameter $\beta_m$ is used to adjust a phase size of S(m). For the parameter A and the parameter $\beta_m$, refer to the descriptions in the second and third possible implementations. The two parameters adjust the value of the S(m) together, and details are not described herein again.

In some other embodiments, if the interference to the first reference signal includes the non-linear interference generated by the precoding of the first communication apparatus, to eliminate impact of the non-linear interference on the first reference signal, an amplitude of a value in the preset set falls within a range of a signal amplitude in which a non-linear modulo operation is not performed. In this manner, the non-linear modulo operation does not affect a phase and an amplitude of the first reference signal, and therefore does not affect subsequent calculation for the phase noise.

In this embodiment of this application, the first signal may be a DFT-s-OFDM signal, or an SC-QAM signal, or an SC-QAM signal, a DFT-s-OFDM signal, an SC-OQAM signal, or a DFT-s-OFDM with FTSS signal. The first signal carries a DFT-s-OFDM signal of a PAM constellation, a DFT-s-OFDM signal of an additive shaping filter of the PAM constellation, a DFT-S-OFDM signal with detached real and imaginary parts of the additive shaping filter, a uw-DFT-s-OFDM signal, a uw-DFT-s-OFDM signal with detached real and imaginary parts, a uw-DFT-s-OFDM with FTSS signal, a uw-DFT-s-OFDM signal of the PAM constellation, a uw-DFT-s-OFDM signal with detached real and imaginary parts of the additive shaping filter, and a uw-DFT-s-OFDM signal of the additive shaping filter of the PAM constellation, a zt-DFT-s-OFDM signal, a zt-DFT-s-OFDM with FTSS signal, a zt-DFT-s-OFDM signal with detached real and imaginary parts, a zt-DFT-s-OFDM signal of the PAM constellation, a zt-DFT-s-OFDM signal with detached real and imaginary parts of the additive shaping filter, a zt-DFT-s-OFDM signal of the additive shaping filter of the PAM constellation, and the like. It should be noted that the foregoing waveforms are named based on features of the waveforms. During actual application, the foregoing waveforms may alternatively be named in another manner.

The following uses the DFT-s-OFDM signal as an example for description.

Optionally, the first signal includes one or more DFT-s-OFDM signals, one DFT-s-OFDM signal includes a phase-tracking reference signal block (Block-PTRS) (for example, may be one or more Block-PTRSs). The Block-PTRS includes the first reference signal and the second reference signal, and the second reference signal is used to make a received value of the first reference signal at the receiving end be the preset received value. Optionally, the Block-PTRS may further include the data signal.

Figure 6:
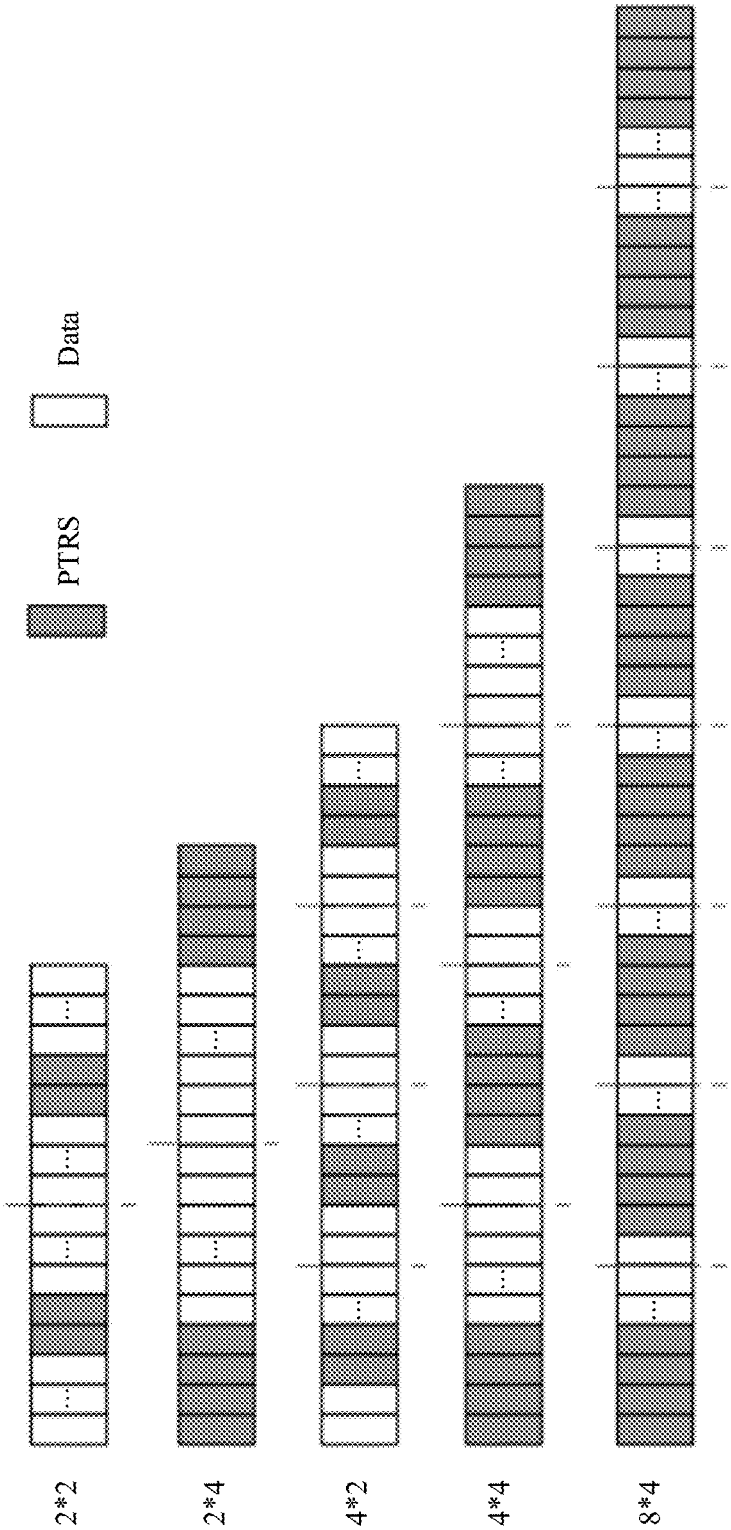
FIG. 6 is a schematic diagram of Block-PTRSs of some DFT-s-OFDM signals according to an embodiment of this application.

For example, FIG. 6 is a schematic diagram of Block-PTRS of some DFT-s-OFDM signals according to an embodiment of this application. In FIG. 6, each grid represents a sampling point (or referred to as a quadrature amplitude modulation (quadrature amplitude modulation, QAM) symbol or a pi/2 binary phase shift keying (binary phase shift keying, BPSK) symbol or a quadrature phase shift keying (quadrature phase shift keying, QPSK) symbol). Parameters (for example, 2*2, 2*4, 4*2, 4*4, and 8*4) of a Block-PTRS pattern are used to represent a quantity P of PTRS groups in one DFT-s-OFDM signal and a quantity Q of sampling points in a group, that is, a total quantity of PTRSs is P*Q. It should be noted that a specific mapping location of the PTRS is related to the two parameters and a scheduled bandwidth. In addition, the mapping location of the signal may be understood as a sequence of sending the signal in time domain. If mapping locations of two signals in the Block-PTRS are adjacent, it may be considered that sending time of the two signals are adjacent in time domain.

When the quantity Q of sampling points in a group is equal to 2, the scheduled bandwidth is evenly divided into P segments or P intervals, and one PTRS group is mapped in the middle of each segment, as shown in a first row (corresponding to a case in which P=2) and a third row (corresponding to a case in which P=4) in FIG. 6. When the quantity Q of sampling points in a group is equal to 4, the scheduled bandwidth is evenly divided into P segments or P intervals, and then one PTRS group is mapped in each segment or each interval. A PTRS group in a first segment is mapped to a header of the first segment, a PTRS group in a $P^{th}$ segment is mapped to a tail of the $P^{th}$ segment, and a PTRS group of another segment (or referred to as another interval) is mapped to the middle. As shown in a second row (corresponding to a case in which P=2, because there are only two segments in this case, there is no PTRS group mapped to the middle of the segment), a fourth row (corresponding to a case in which P=4), and a fifth row (corresponding to a case in which P=8) in FIG. 6.

In a transmission process, the foregoing two parameters are implicitly determined by a current scheduled bandwidth $N_{RB}$ based on a preconfigured mapping relationship (a corresponding relationship between a scheduled bandwidth and a parameter, as shown in Table 1, where $N_{RB0}$ to $N_{RB4}$ are preconfigured values).

TABLE 1

| Preset bandwidth (Scheduled bandwidth) | Quantity of PTRS groups (Number of PTRS groups) | Quantity of sampling points per PTRS group (Number of samples per PTRS group) |
|---|---|---|
| $N_{RB0} \le N_{RB} < N_{RB1}$ | 2 | 2 |
| $N_{RB1} \le N_{RB} < N_{RB2}$ | 2 | 4 |
| $N_{RB2} \le N_{RB} < N_{RB3}$ | 4 | 2 |
| $N_{RB3} \le N_{RB} < N_{RB4}$ | 4 | 4 |
| $N_{RB4} \le N_{RB}$ | 8 | 4 |

In some embodiments, the first signal may be generated based on the foregoing described location mapping manner of the reference signal (PTRS) and the data signal in embodiments of this application. It should be noted that the PTRS shown in FIG. 6 includes the first reference signal and the second reference signal. For example, for a possible case of 2*2, a first PTRS in one Block-PTRS is used as the first reference signal, and a second PTRS is used as the second reference signal.

In some other embodiments, the location mapping of the PTRS and the data signal in the first signal may alternatively be performed in another manner. For example, the PTRS shown in FIG. 6 may be used as the first reference signal in the first signal, and some locations are selected from mapping locations of the data signal, to map the second reference signal. Alternatively, in some other embodiments, there may be another location mapping manner of the first reference signal, the second reference signal, and the data signal without using the manner shown in FIG. 6. This is not limited in embodiments of this application.

The foregoing describes the location mapping manner of the reference signals (the first reference signal and the second reference signal) in the first signal. The following specifically describes a manner of determining a value of the reference signal in the first signal in embodiments of this application.

In this embodiment of this application, the value of the second reference signal is determined by the value of the first reference signal, the preset received value of the first reference signal, and the value of the interference to the first reference signal. For example, if the received value of the first reference signal at the signal receiving end is the preset received value, the relationship shown in a formula 1-5 exists.

$$S(m) = \tilde{S}_{PTRS}(m) + f^{l}_{PTRS}(m) + f_{others}(m) \qquad \text{Formula 1-5}$$

$f$ is a function for calculating the interference to the first reference signal. A manner of calculating the interference is not limited in this application. $f$ may be determined by one type of interference, or may be determined by a plurality of types of interference. $\tilde{S}_{PTRS}(m)$ is a value of the $m^{th}$ reference signal in the first signal at the transmitting end, and S(m) is a preset received value of the $m^{th}$ reference signal at the receiving end.

$$f^{l}_{PTRS}(m)$$

is a value of interference of the $l^{th}$ reference signal (that is, the second reference signal) to the $m^{th}$ reference signal (that is, the first reference signal). $f_{others}(m)$ is a value of interference of another signal (including the reference signal and the data signal) other than the $l^{th}$ reference signal in the first signal to the first reference signal, m is the location index (or referred to as a sequence number, a series number, or the like) of the first reference signal, and l is the location index of the second reference signal. It should be noted that the location index of the signal may indicate a sending order of the signal in time domain.

A manner of determining the value of the second reference signal may be obtained based on the relationship shown in the formula 1-5. Refer to a formula 1-6.

$$\tilde{S}_{PTRS}(l)=g(S(m)-\tilde{S}_{PTRS}(m)-f_{others}(m)) \qquad \text{Formula 1-6}$$

The value of the second reference signal is $\tilde{S}_{PTRS}(l)$, where g is an inverse function of a function for calculating the interference to the first reference signal.

A manner of determining the value of the first reference signal may be obtained based on the relationship shown in the formula 1-5. Refer to a formula 1-7.

$$\tilde{S}_{PTRS}(m) = S(m) - f_{PTRS}^{l}(m) - f_{others}(m) \quad \text{Formula 1-7}$$

For the first communication apparatus, a value of the data signal that needs to be transmitted is known. In addition, the preset received value of the first reference signal at the receiving end is agreed upon by both the signal transmitting end (that is, the first communication apparatus) and the signal receiving end (that is, the second communication apparatus), in other words, is known. Based on the formula 1-6 and the formula 1-7, there may be a plurality of groups of possible values of the first reference signal and the second reference signal, and the first communication apparatus may select one of the groups as the values of the first reference signal and the second reference signal. For example, the first communication apparatus may preset a value range of the first reference signal and the second reference signal, and select a value that meets the value range from the plurality of groups of possible values. In another example, the first communication apparatus may preset a plurality of optional values of the first reference signal, and may determine the value of the second reference signal by substituting the plurality of optional values of the first reference signal into the formula 1-6.

For the second communication apparatus, a value of the first reference signal received in an ideal state (without the phase noise) should be the preset received value. For a value y(m) of the first reference signal, refer to a formula 1-8.

$$y(m)=S(m) \quad \text{Formula 1-8}$$

S(m) is the preset received value of an $m^{th}$ reference signal at the receiving end. For an expression of S(m), refer to the formula 1-5, and m is the location index of the first reference signal.

The following describes some manners of selecting the location index of the second reference signal.

In a possible implementation, the location index of the second reference signal when a value of the interference to the first reference signal is minimized may be selected.

Refer to a formula 1-9.

$$\underset{D,p}{\operatorname{argmin}} \left| \sum_{\substack{l=1 \\ l \neq p}}^{L} f_l x_{k-l} + f_p D_{k-p} \right| \quad \text{Formula 1-9}$$

$f$ is a function for calculating the interference to the first reference signal, l is a location index where a signal x is sent, p is a location index where the second reference signal is sent, k is a location index where the first reference signal is sent, and D is the value of the second reference signal. The location index of the second reference signal may be determined by solving the formula 1-9.

In another possible implementation, the location index where the second reference signal is located may be selected when the preset received value of the first reference signal is as large as possible (facilitating phase noise calculation) when an amplitude does not exceed a preset range (for example, the range is (−M, M)), and the second reference signal does not affect the phase in the preset received value of the first reference signal.

Refer to a formula 1-10.

$$\underset{D,p}{\operatorname{argmax}} \left| a_k - \sum_{\substack{l=1 \\ l \neq p}}^{L} f_l x_{k-l} - f_p D_{k-p} \right| \quad \text{Formula 1-10}$$

$$\text{s.t.} \quad |D_{k-p}| \in [-M, M)$$

$f$ is a function for calculating the interference to the first reference signal, l is a location index of a signal where a signal x is sent, p is a location index where the second reference signal is sent, k is a location index where the first reference signal is sent, a is the value of the first reference signal, and D is the value of the second reference signal. s. t. indicates a constraint condition. The constraint condition is that an amplitude of a sent signal D is between (−M, M). The location index of the second reference signal may be determined by solving the formula 1-10.

To implement functions in the foregoing method provided in embodiments of this application, the first communication apparatus and the second communication apparatus may include a hardware structure and a software module, and implement the foregoing functions in a form of the hardware structure, the software module, or a combination of the hardware structure and the software module. One of the foregoing functions may be performed by using the hardware structure, the software module, or the combination of the hardware structure and the software module.

Figure 7:
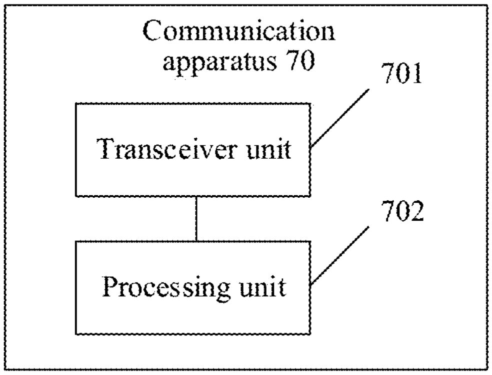
FIG. 7 is a schematic diagram of a structure of a communication apparatus according to an embodiment of this application.

FIG. 7 is a schematic diagram of a structure of a communication apparatus according to an embodiment of this application. The communication apparatus 70 includes a transceiver unit 701 and a processing unit 702. The following describes the two units in detail.

In an embodiment:

the processing unit 702 is configured to determine a first signal, where the first signal includes a reference signal block, and the reference signal block includes a first reference signal and a second reference signal. The second reference signal is used to make a received value of the first reference signal at a receiving end be a preset received value. Specifically, for an operation performed by the processing unit 702, refer to the descriptions in step S101 in the method shown in FIG. 5.

The transceiver unit 701 is configured to send the first reference signal at a first moment, and send the second reference signal at a second moment. An interval between the first moment and the second moment is equal to a time interval of X transmitted signals, and the time interval of the transmitted signals is Ts/n. X is a positive integer, Ts is a symbol periodicity, and n is a quantity of signals transmitted in the symbol periodicity. Specifically, for an operation performed by the transceiver unit 701, refer to the descriptions in step S102 in the method shown in FIG. 5.

In a possible implementation, the preset received value of the first reference signal is a subset of a preset set.

In a possible implementation, a value of the second reference signal is determined based on a value of the first reference signal, the preset received value of the first reference signal, and a value of interference to the first reference signal.

In a possible implementation, the value of the second reference signal is $\tilde{S}_{PTRS}(l)$, and $\tilde{S}_{PTRS}(l)=g(S(m)-\tilde{S}_{PTRS}(m)-f_{others}(m))$. g is an inverse function of a function for calculating the interference to the first reference signal, $\tilde{S}_{PTRS}(m)$ is a value of an $m^{th}$ reference signal in the first signal at a transmitting end, S(m) is a preset received value of the $m^{th}$ reference signal at the receiving end, $f_{others}(m)$ is a value of interference of a signal other than the second reference signal in the first signal to the first reference signal, m is a location index of the first reference signal, and l is a location index of the second reference signal.

In a possible implementation, the interference to the first reference signal includes inter-symbol interference caused by the second reference signal to the first reference signal, or non-linear interference caused by precoding of the communication apparatus.

In a possible implementation, the transceiver unit 701 is further configured to send first indication information, where the first indication information indicates at least one of the following information: location information and quantity information of the second reference signal.

In a possible implementation, the location information indicates the location index of the second reference signal, or indicates a difference between the location index of the second reference signal and the location index of the first reference signal.

In a possible implementation, the first indication information is carried in at least one of the following signaling: radio resource control RRC signaling, media access control-control element MAC-CE signaling, and downlink control information DCI.

In a possible implementation, the transceiver unit 701 is further configured to send second indication information, where the second indication information indicates that the second reference signal exists in the reference signal block.

It should be noted that, in the foregoing embodiment, the communication apparatus 70 may be a network device, an apparatus in the network device, or an apparatus that can be used together with the network device. The communication apparatus 70 may alternatively be a terminal device, an apparatus in the terminal device, or an apparatus that can be used together with the terminal device.

Specifically, for operations performed by units of the communication apparatus 70 shown in FIG. 7, refer to related contents of the first communication apparatus in the method embodiment corresponding to FIG. 5. Details are not described herein again. The foregoing units may be implemented by hardware, software, or a combination of software and hardware. In an embodiment, functions of the transceiver unit 701 and the processing unit 702 in the foregoing content may be implemented by one or more processors in the communication apparatus 70.

In this embodiment, the first signal sent by the communication apparatus 70 includes at least one reference signal block, and one reference signal block includes the first reference signal and the second reference signal. The second reference signal is used to make the received value of the first reference signal at the receiving end be the preset received value, so that impact of the interference on the first reference signal can be eliminated. In this way, the signal receiving end can effectively process phase noise based on the received first signal.

In another embodiment:

the transceiver unit 701 is configured to receive a first received signal at a third moment, and receive a second received signal at a fourth moment. The first received signal is a received first reference signal transmitted through a radio channel, the second received signal is a received second reference signal transmitted through the radio channel, and the second reference signal is used to make a received value of the first reference signal at a receiving end be a preset received value. An interval between the third moment and the fourth moment is equal to a time interval of X transmitted signals, and the time interval of the transmitted signals is Ts/n. X is a positive integer, Ts is a symbol periodicity, and n is a quantity of signals transmitted in the symbol periodicity. Specifically, for an operation performed by the transceiver unit 701, refer to the descriptions in step S103 in the method shown in FIG. 5.

The processing unit 702 is configured to determine phase noise based on the first reference signal, the first received signal, the second received signal, and the preset received value of the first reference signal. Specifically, for an operation performed by the processing unit 702, refer to the descriptions in step S104 in the method shown in FIG. 5.

In a possible implementation, the preset received value of the first reference signal is a subset of a preset set.

In a possible implementation, a value of the first reference signal is determined based on a value of the second reference signal, the preset received value of the first reference signal, and a value of interference to the first reference signal.

In a possible implementation, the value of the first reference signal is y(m), and y(m)=S(m). S(m) is a preset received value of an $m^{th}$ reference signal at the receiving end, and m is a location index of the first reference signal.

In a possible implementation, the interference to the first reference signal includes inter-symbol interference caused by the second reference signal to the first reference signal, or non-linear interference caused by precoding of the communication apparatus.

In a possible implementation, the transceiver unit 701 is further configured to receive first indication information, where the first indication information indicates at least one of the following information: location information and quantity information of the second reference signal.

In a possible implementation, the location information indicates a location index of the second reference signal, or indicates a difference between the location index of the second reference signal and the location index of the first reference signal.

In a possible implementation, the first indication information is carried in at least one of the following signaling: radio resource control RRC signaling, media access control-control element MAC-CE signaling, and downlink control information DCI.

In a possible implementation, the transceiver unit 701 is further configured to receive second indication information, where the second indication information indicates that the second reference signal exists in a reference signal block.

It should be noted that, in the foregoing embodiment, the communication apparatus 70 may be a network device, an apparatus in the network device, or an apparatus that can be used together with the network device. The communication apparatus 70 may alternatively be a terminal device, an apparatus in the terminal device, or an apparatus that can be used together with the terminal device.

Specifically, for operations performed by units of the communication apparatus 70 shown in FIG. 7, refer to related contents of the second communication apparatus in the method embodiment corresponding to FIG. 5. Details are not described herein again. The foregoing units may be implemented by hardware, software, or a combination of software and hardware. In an embodiment, functions of the transceiver unit 701 and the processing unit 702 in the foregoing content may be implemented by one or more processors in the communication apparatus 70.

In this embodiment, the communication apparatus 70 may obtain the first reference signal and the second reference signal that are sent by a transmitting end, and determine the phase noise based on the first reference signal, the first received signal, the second received signal, and the preset received value of the first reference signal.

Figure 8:
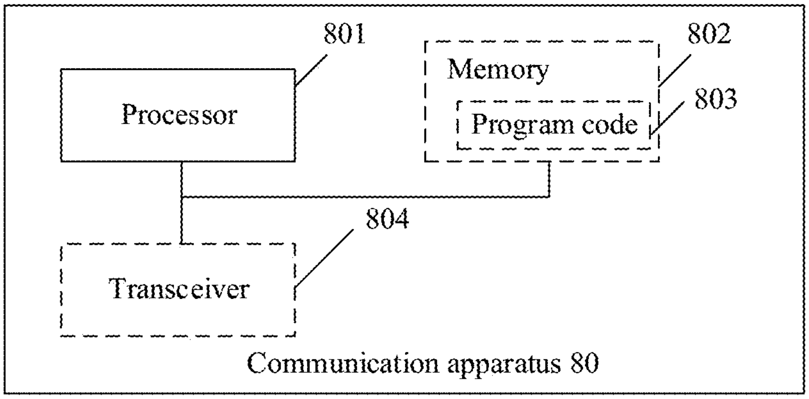
FIG. 8 is a schematic diagram of a structure of another communication apparatus according to an embodiment of this application.

FIG. 8 is a schematic diagram of a structure of another communication apparatus according to an embodiment of this application. The communication apparatus 80 may be configured to implement the method described in the foregoing method embodiment. For details, refer to the descriptions in the foregoing method embodiment.

The communication apparatus 80 may include one or more processors 801. The processor 801 may be a general-purpose processor, a dedicated processor, or the like. The processor 801 may be configured to control the communication apparatus (for example, a network device, a network device chip, a terminal device, or a terminal device chip), execute a software program, and process data of the software program.

Optionally, the communication apparatus 80 may include one or more memories 802 that may store program code 803. The program code may be run on the processor 801, to enable the communication apparatus 80 to perform the method described in the foregoing method embodiment. Optionally, the memory 802 may further store data. The processor 801 and the memory 802 may be disposed separately, or may be integrated together. Optionally, the memory 802 may alternatively be located outside the communication apparatus 80, and may be coupled to the communication apparatus 80 in some manners.

Optionally, the communication apparatus 80 may further include a transceiver 804. The transceiver 804 may be referred to as a transceiver unit, a transceiver machine, a transceiver circuit, or the like, and is configured to implement a transceiving function. The transceiver 804 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function.

In an embodiment:

the processor 801 is configured to determine a first signal, where the first signal includes a reference signal block, and the reference signal block includes a first reference signal and a second reference signal. The second reference signal is used to make a received value of the first reference signal at a receiving end be a preset received value.

The processor 801 is further configured to send the first reference signal at a first moment, and send the second reference signal at a second moment. An interval between the first moment and the second moment is equal to a time interval of X transmitted signals, and the time interval of the transmitted signals is Ts/n. X is a positive integer, Ts is a symbol periodicity, and n is a quantity of signals transmitted in the symbol periodicity.

In a possible implementation, the preset received value of the first reference signal is a subset of a preset set.

In a possible implementation, a value of the second reference signal is determined based on a value of the first reference signal, the preset received value of the first reference signal, and a value of interference to the first reference signal.

In a possible implementation, the value of the second reference signal is $\tilde{S}_{PTRS}(l)$, and $\tilde{S}_{PTRS}(l)=g(S(m)-\tilde{S}_{PTRS}(m)-f_{others}(m))$. g is an inverse function of a function for calculating the interference to the first reference signal, $\tilde{S}_{PTRS}(m)$ is a value of an $m^{th}$ reference signal in the first signal at a transmitting end, S(m) is a preset received value of the $m^{th}$ reference signal at the receiving end, $f_{others}(m)$ is a value of interference of a signal other than the second reference signal in the first signal to the first reference signal, m is a location index of the first reference signal, and l is a location index of the second reference signal.

In a possible implementation, the interference to the first reference signal includes inter-symbol interference caused by the second reference signal to the first reference signal, or non-linear interference caused by precoding of the communication apparatus.

In a possible implementation, the processor 801 is further configured to invoke the program code 803 from the memory 802 to perform the following operation: sending first indication information, where the first indication information is used to indicate at least one of the following information: location information and quantity information of the second reference signal.

In a possible implementation, the location information indicates the location index of the second reference signal, or indicates a difference between the location index of the second reference signal and the location index of the first reference signal.

In a possible implementation, the first indication information is carried in at least one of the following signaling: radio resource control RRC signaling, media access control-control element MAC-CE signaling, and downlink control information DCI.

In a possible implementation, the processor 801 is further configured to invoke the program code 803 from the memory 802 to perform the following operation: sending second indication information, where the second indication information is used to indicate that the second reference signal exists in the reference signal block.

It should be noted that the communication apparatus 80 may be a network device, may be a terminal device, may be a chip, a chip system, a processor, or the like that supports the network device in implementing the foregoing method, or may be a chip, a chip system, a processor, or the like that supports the terminal device in implementing the foregoing method.

Specifically, for operations performed by the communication apparatus 80, refer to related contents of the first communication apparatus in the method embodiment corresponding to FIG. 5. Details are not described herein again.

In this embodiment, the first signal sent by the communication apparatus 80 includes at least one reference signal block, and one reference signal block includes the first reference signal and the second reference signal. The second reference signal is used to make the received value of the first reference signal at the receiving end be the preset received value, so that impact of the interference on the first reference signal can be eliminated. In this way, the signal receiving end can effectively process phase noise based on the received first signal.

In another embodiment:

the processor 801 is configured to receive a first received signal at a third moment, and receive a second received signal at a fourth moment. The first received signal is a received first reference signal transmitted through a radio channel, the second received signal is a received second reference signal transmitted through the radio channel, and the second reference signal is used to make a received value of the first reference signal at a receiving end be a preset received value. An interval between the third moment and the fourth moment is equal to a time interval of X transmitted signals, and the time interval of the transmitted signals is Ts/n. X is a positive integer, Ts is a symbol periodicity, and n is a quantity of signals transmitted in the symbol periodicity.

The processor 801 is further configured to determine phase noise based on the first reference signal, the first received signal, the second received signal, and the preset received value of the first reference signal.

In a possible implementation, the preset received value of the first reference signal is a subset of a preset set.

In a possible implementation, a value of the first reference signal is determined based on a value of the second reference signal, the preset received value of the first reference signal, and a value of interference to the first reference signal.

In a possible implementation, the value of the first reference signal is y(m), and y(m)=S(m). S(m) is a preset received value of an $m^{th}$ reference signal at the receiving end, and m is a location index of the first reference signal.

In a possible implementation, the interference to the first reference signal includes inter-symbol interference caused by the second reference signal to the first reference signal, or non-linear interference caused by precoding of the communication apparatus.

In a possible implementation, the processor 801 is further configured to invoke the program code 803 from the memory 802 to perform the following operation: receiving first indication information, where the first indication information is used to indicate at least one of the following information: location information and quantity information of the second reference signal.

In a possible implementation, the location information indicates a location index of the second reference signal, or indicates a difference between the location index of the second reference signal and the location index of the first reference signal.

In a possible implementation, the first indication information is carried in at least one of the following signaling: radio resource control RRC signaling, media access control-control element MAC-CE signaling, and downlink control information DCI.

In a possible implementation, the processor 801 is further configured to invoke the program code 803 from the memory 802 to perform the following operation: receiving second indication information, where the second indication information is used to indicate that the second reference signal exists in a reference signal block.

It should be noted that the communication apparatus 80 may be a network device, may be a terminal device, may be a chip, a chip system, a processor, or the like that supports the network device in implementing the foregoing method, or may be a chip, a chip system, a processor, or the like that supports the terminal device in implementing the foregoing method.

Specifically, for operations performed by the communication apparatus 80, refer to related contents of the second communication apparatus in the method embodiment corresponding to FIG. 5. Details are not described herein again.

In this embodiment, the communication apparatus 80 may obtain the first reference signal and the second reference signal that are sent by a transmitting end, and determine the phase noise based on the first reference signal, the first received signal, the second received signal, and the preset received value of the first reference signal.

In another possible design, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In another possible design, the communication apparatus 80 may include a circuit. The circuit may implement the sending, receiving, or communication function in the foregoing method embodiments.

The processor and the transceiver that are described in this application may be implemented on an integrated circuit (integrated circuit, IC), an analog IC, a radio frequency integrated circuit RFIC, a mixed-signal IC, an application specific integrated circuit (application specific integrated circuit, ASIC), a printed circuit board (printed circuit board, PCB), an electronic device, or the like.

The communication apparatus in the foregoing embodiment may be a network device or a terminal device. However, a scope of the communication apparatus described in this application is not limited thereto, and a structure of the communication apparatus may not be limited by FIG. 8. The communication apparatus may be an independent device or may be a part of a large device. For example, the communication apparatus may be:

(1) an independent integrated circuit IC, a chip, or a chip system or subsystem;

(2) a set of one or more ICs, where optionally, the IC set may alternatively include a storage component configured to store data and program code;

(3) an ASIC, for example, a modem (Modem);

(4) a module that can be embedded in another device;

(5) a receiver, an intelligent terminal, a wireless device, a handheld device, a mobile unit, a vehicle-mounted device, a cloud device, an artificial intelligence device, and the like; and (6) others.

Figure 9:
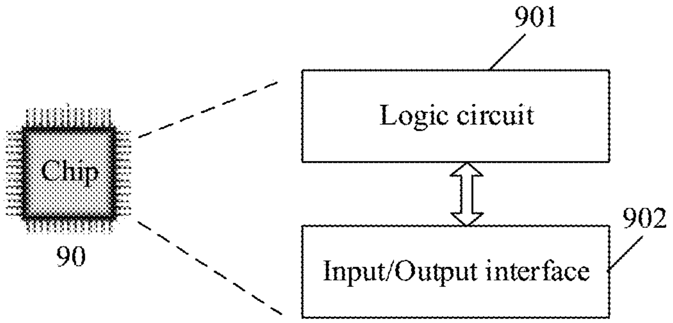
FIG. 9 is a schematic diagram of a structure of a chip according to an embodiment of this application.

For a case in which the communication apparatus may be a chip or a chip system, refer to a schematic diagram of a structure of a chip shown in FIG. 9. A chip 90 shown in FIG. 9 includes a logic circuit 901 and an input/output interface 902. There may be one or more logic circuits 901 and a plurality of input/output interfaces 902.

For a case in which the chip is configured to implement a function of the first communication apparatus in embodiments of this application:

The logic circuit 901 is configured to determine a first signal, where the first signal includes a reference signal block, and the reference signal block includes a first reference signal and a second reference signal. The second reference signal is used to make a received value of the first reference signal at a receiving end be a preset received value.

The input/output interface 902 is configured to output the first reference signal at a first moment, and output the second reference signal at a second moment. An interval between the first moment and the second moment is equal to a time interval of X transmitted signals, and the time interval of the transmitted signals is Ts/n. X is a positive integer, Ts is a symbol periodicity, and n is a quantity of signals transmitted in the symbol periodicity.

The logic circuit is further configured to process the first signal. For an operation performed by the logic circuit 901, refer to the descriptions about the first communication apparatus in the embodiment corresponding to FIG. 5.

For a case in which the chip is configured to implement a function of the second communication apparatus in embodiments of this application:

The input/output interface 902 is configured to input a first received signal at a third moment, and input a second received signal at a fourth moment. The first received signal is a received first reference signal transmitted through a radio channel, the second received signal is a received second reference signal transmitted through the radio channel, and the second reference signal is used to make a received value of the first reference signal at a receiving end be a preset received value. An interval between the third moment and the fourth moment is equal to a time interval of X transmitted signals, and the time interval of the transmitted signals is Ts/n. X is a positive integer, Ts is a symbol periodicity, and n is a quantity of signals transmitted in the symbol periodicity.

The logic circuit 901 is configured to process the first received signal and the second received signal, and perform the following operation: determining phase noise based on the first reference signal, the first received signal, the second received signal, and the preset received value of the first reference signal. Specifically, for an operation performed by the logic circuit 901, refer to the descriptions about the second communication apparatus in the embodiment corresponding to FIG. 5.

A person skilled in the art may further understand that various illustrative logical blocks (illustrative logic block) and steps (step) that are listed in embodiments of this application may be implemented by using electronic hardware, computer software, or a combination thereof. Whether the functions are implemented by using hardware or software depends on particular applications and a design requirement of an entire system. A person skilled in the art may use various methods to implement the described functions for each particular application, but it should not be considered that the implementation goes beyond the scope of embodiments of this application.

This application further provides a computer-readable storage medium storing a computer program. When the computer-readable storage medium is executed by a computer, the function in any one of the foregoing method embodiments is implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When the software is used to implement embodiments, all or a part of embodiments may be implemented in a form of a computer program product. The computer program product includes one or more computer instructions. When the computer instructions are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or may be a data storage device, such as a server or a data center that integrates one or more usable media. The usable medium may be a magnetic medium (for example, a floppy disk, a hard disk drive, or a magnetic tape), an optical medium (for example, a high-density digital video disc (digital video disc, DVD)), a semiconductor medium (for example, a solid-state drive (solid-state drive, SSD)), or the like.

A person of ordinary skill in the art may understand that various numerals such as "first" and "second" in this application are merely used for differentiation for ease of description, and are not used to limit the scope or a sequence of embodiments of this application.

The correspondences shown in the tables in this application may be configured, or may be predefined. Values of the information in the tables are merely examples, and other values may be configured. This is not limited in this application. When a correspondence between the information and the parameters is configured, not all the correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, a hash list, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

What is claimed is:

1. A communication method, wherein the method comprises:

determining, by a communication apparatus, a first signal, wherein the first signal comprises a reference signal block, the reference signal block comprises a first reference signal and a second reference signal, and the second reference signal indicates that a value of the first reference signal at a receiving end is a preset received value; and sending, by the communication apparatus, the first reference signal at a first moment; and sending, by the communication apparatus, the second reference signal at a second moment, wherein a time interval between the first moment and the second moment is equal to a time interval of X transmitted signals, and a time interval of two consecutive transmitted signals is Ts/n, wherein X is a positive integer, Ts is a symbol periodicity, and n is a quantity of signals transmitted in the symbol periodicity;

wherein a value of the second reference signal is determined based on a value of the first reference signal, the preset received value of the first reference signal, and a value of an interference to the first reference signal; and wherein the value of the second reference signal is $\tilde{S}_{PTRS}(l)$, and $\tilde{S}_{PTRS}(l)=g(S(m)-\tilde{S}_{PTRS}(m)-f_{others}(m))$, wherein g is an inverse function of a function for calculating the interference to the first reference signal, $\tilde{S}_{PTRS}(m)$ is a value of an $m^{th}$ reference signal in the first signal at a transmitting end, S(m) is a preset received value of the $m^{th}$ reference signal at the receiving end, $f_{others}(m)$ is a value of interference of a signal other than the second reference signal in the first signal to the first reference signal, m is a location index of the first reference signal, and l is a location index of the second reference signal.

2. The method according to claim 1, wherein the preset received value of the first reference signal is a subset of a preset set of values.

3. The method according to claim 1, wherein the interference to the first reference signal comprises inter-symbol interference caused by the second reference signal to the first reference signal, or non-linear interference caused by precoding of the communication apparatus.

4. The method according to claim 1, wherein the method further comprises:

sending, by the communication apparatus, first indication information, wherein the first indication information indicates at least one of location information or quantity information of the second reference signal.

5. The method according to claim 4, wherein the location information indicates a location index of the second reference signal, or a difference between the location index of the second reference signal and the location index of the first reference signal.

6. The method according to claim 4, wherein the first indication information is carried in at least one of radio resource control (RRC) signaling, media access control-control element (MAC-CE) signaling, and downlink control information (DCI).

7. The method according to claim 1, wherein the method further comprises:

sending, by the communication apparatus, second indication information, wherein the second indication information indicates that the second reference signal exists in the reference signal block.

8. A communication method, wherein the method comprises:

receiving, by a communication apparatus, a first received signal at a first moment, and receiving a second received signal at a second moment, wherein the first received signal is a received first reference signal transmitted through a radio channel, the second received signal is a received second reference signal transmitted through the radio channel, and the second reference signal indicates that a value of the first reference signal at a receiving end is a preset received value, an interval between the first moment and the second moment is equal to a time interval of X transmitted signals, and a time interval of two consecutive transmitted signals is Ts/n, wherein X is a positive integer, Ts is a symbol periodicity, and n is a quantity of signals transmitted in the symbol periodicity; and determining, by the communication apparatus, phase noise based on the first reference signal, the first received signal, the second received signal, and the preset received value of the first reference signal, wherein a value of the second reference signal is determined based on a value of the first reference signal, the preset received value of the first reference signal, and a value of an interference to the first reference signal; and wherein the value of the second reference signal is $\tilde{S}_{PTRS}(l)$, and $\tilde{S}_{PTRS}(l)=g(S(m)-\tilde{S}_{PTRS}(m)-f_{others}(m))$, wherein g is an inverse function of a function for calculating the interference to the first reference signal, $\tilde{S}_{PTRS}$ (m) is a value of an $m^{th}$ reference signal in the first signal at a transmitting end, S(m) is a preset received value of the $m^{th}$ reference signal at the receiving end, $f_{others}(m)$ is a value of interference of a signal other than the second reference signal in the first signal to the first reference signal, m is a location index of the first reference signal, and l is a location index of the second reference signal.

9. The method according to claim 8, wherein the preset received value of the first reference signal is a subset of a preset set of values.

10. The method according to claim 8, wherein a value of the first reference signal is determined based on a value of the second reference signal, the preset received value of the first reference signal, and a value of an interference to the first reference signal.

11. The method according to claim 10, wherein the value of the first reference signal is y(m), and y(m)=S(m), wherein S(m) is a preset received value of an $m^{th}$ reference signal at the receiving end, and m is a location index of the first reference signal.

12. The method according to claim 10, wherein the interference to the first reference signal comprises inter-symbol interference caused by the second reference signal to the first reference signal, or non-linear interference caused by precoding of the communication apparatus.

13. The method according to claim 8, wherein the method further comprises:

receiving, by the communication apparatus, first indication information, wherein the first indication information indicates at least one of location information or quantity information of the second reference signal.

14. The method according to claim 13, wherein the location information indicates a location index of the second reference signal, or indicates a difference between the location index of the second reference signal and the location index of the first reference signal.

15. The method according to claim 13, wherein the first indication information is carried in at least one of radio resource control (RRC) signaling, media access control-control element (MAC-CE) signaling, and downlink control information (DCI).

16. The method according to claim 8, wherein the method further comprises:

receiving, by the communication apparatus, second indication information, wherein the second indication information indicates that the second reference signal exists in a reference signal block.

17. A communication apparatus, comprising:

a transceiver;

at least one processor; and a memory coupled to the at least one processor and storing programming instructions for execution by the at least one processor to: determine a first signal, wherein the first signal comprises a reference signal block, the reference signal block comprises a first reference signal and a second reference signal, and the second reference signal indicates that a value of the first reference signal at a receiving end is a preset received value;

send, through the transceiver, the first reference signal at a first moment; and send, through the transceiver, the second reference signal at a second moment, wherein a time interval between the first moment and the second moment is equal to a time interval of X transmitted signals, and a time interval of two consecutive transmitted signals is Ts/n, wherein X is a positive integer, Ts is a symbol periodicity, and n is a quantity of signals transmitted in the symbol periodicity, wherein a value of the second reference signal is determined based on a value of the first reference signal, the preset received value of the first reference signal, and a value of an interference to the first reference signal; and wherein the value of the second reference signal is $\tilde{S}_{PTRS}(l)$, and $\tilde{S}_{PTRS}(l)=g(S(m)-\tilde{S}_{PTRS}(m)-f_{others}(m))$, wherein g is an inverse function of a function for calculating the interference to the first reference signal, $\tilde{S}_{PTRS}(m)$ is a value of an $m^{th}$ reference signal in the first signal at a transmitting end, S(m) is a preset received value of the $m^{th}$ reference signal at the receiving end, $f_{others}(m)$ is a value of interference of a signal other than the second reference signal in the first signal to the first reference signal, m is a location index of the first reference signal, and l is a location index of the second reference signal.

18. The communication apparatus according to claim 17, wherein the preset received value of the first reference signal is a subset of a preset set of values.

19. The communication apparatus according to claim 17, wherein the interference to the first reference signal comprises inter-symbol interference caused by the second reference signal to the first reference signal, or non-linear interference caused by precoding of the communication apparatus.

20. The communication apparatus according to claim 17, wherein the programming instructions are for execution by the at least one processor to:

send first indication information, wherein the first indication information indicates at least one of location information or quantity information of the second reference signal.

* * * * *